United States Patent [19]

Green et al.

[11] Patent Number: 5,337,805
[45] Date of Patent: Aug. 16, 1994

[54] AIRFOIL CORE TRAILING EDGE REGION

[75] Inventors: Dennis J. Green, Amston, Conn.; Edward R. Szela, Chicopee, Mass.; George J. Yamarik, Vernon; David R. Martin, East Hartford, both of Conn.

[73] Assignee: United Technologies Corporation, Hartford, Conn.

[21] Appl. No.: 981,951

[22] Filed: Nov. 24, 1992

[51] Int. Cl.$^5$ .............................................. B22C 9/10
[52] U.S. Cl. .................................... 164/369; 164/122.1
[58] Field of Search ............ 164/369, 361, 365, 122.1

[56] References Cited

U.S. PATENT DOCUMENTS

| | | | |
|---|---|---|---|
| 3,965,963 | 6/1976 | Phipps et al. | 164/365 X |
| 4,148,350 | 4/1979 | Rossmann | 164/361 X |
| 4,596,281 | 6/1986 | Bishop | 164/369 X |
| 4,627,480 | 12/1986 | Lee | 164/369 |
| 5,050,665 | 9/1991 | Judd | 164/361 X |

FOREIGN PATENT DOCUMENTS 2105624A  3/1983  United Kingdom ................ 164/369

OTHER PUBLICATIONS

Single Sheet entitled "1st HPT Blade Core"—A1 Configuration—Admitted Prior Art.

*Primary Examiner*—J. Reed Batten, Jr.
*Attorney, Agent, or Firm*—Gene D. Fleischhauer

[57] ABSTRACT

An airfoil core has a frame formed of passage forming elements supporting a pair of spanwisely extending passage forming elements within the frame. The pair of passage forming elements has at least one plurality of hole forming elements extending chordwisely therefrom and supported in part by at least one of the pair of passage forming elements to increase the durability of the core. In one embodiment, the core includes a trailing edge region framed by spanwisely and chordwisely extending elements.

11 Claims, 2 Drawing Sheets

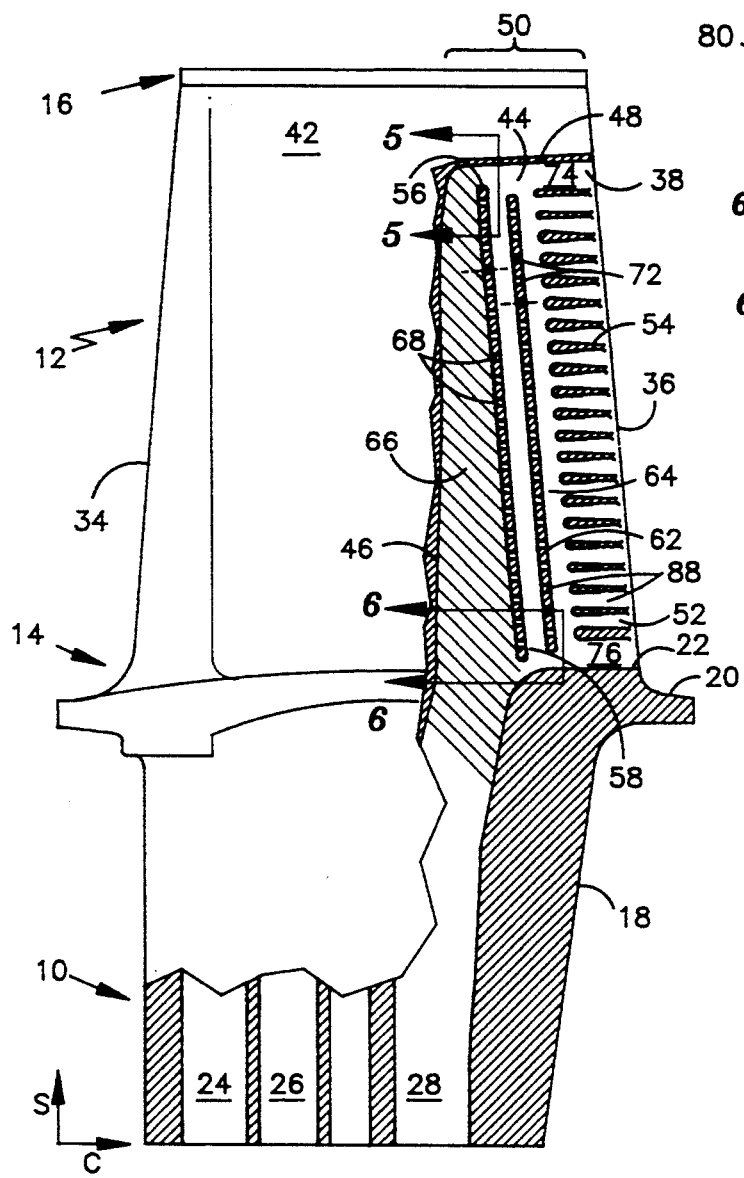
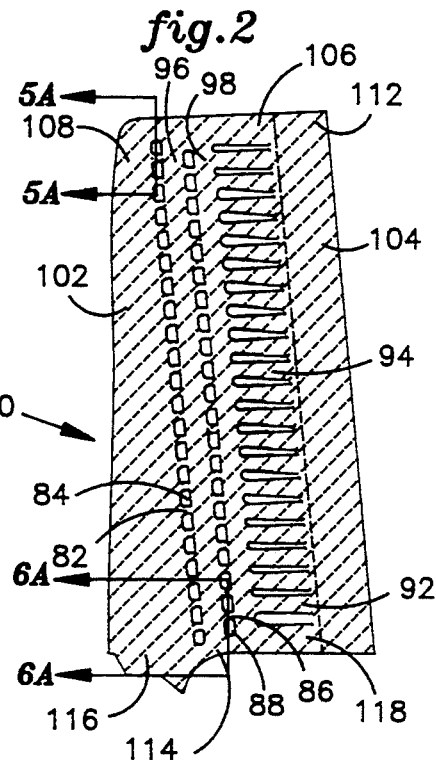
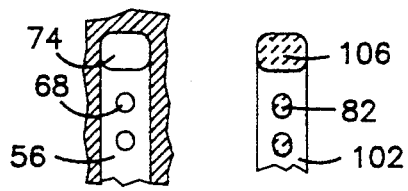
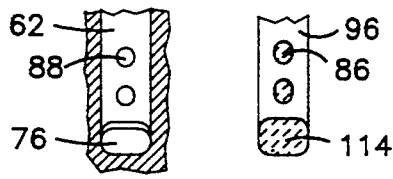

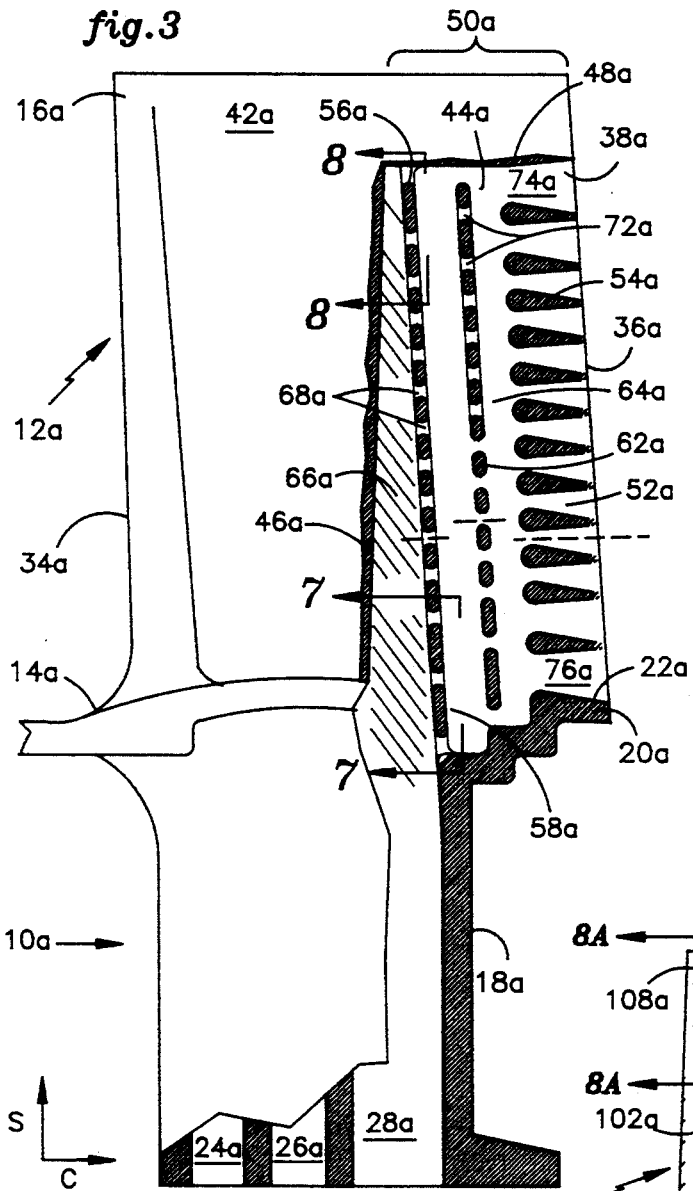
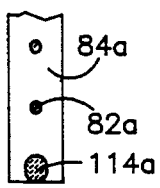
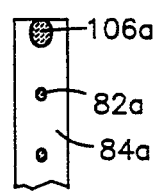
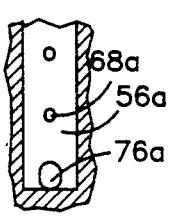
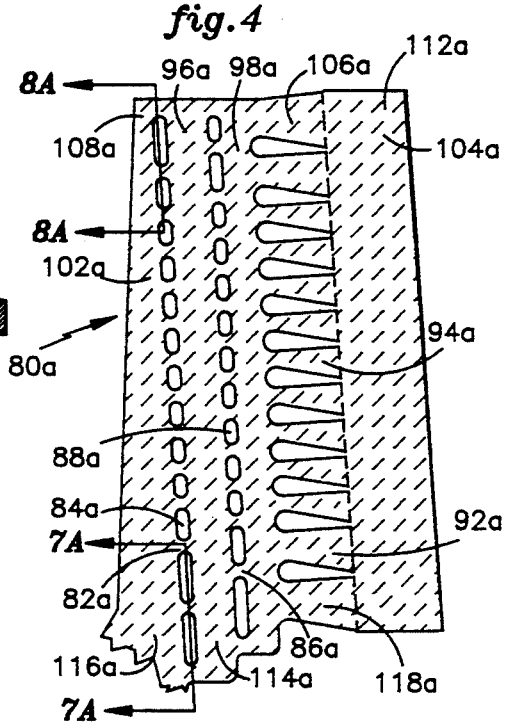

AIRFOIL CORE TRAILING EDGE REGION

TECHNICAL FIELD

This invention relates to coolable airfoil structures of the type used in high temperature rotary machines, and more specifically, to structure for forming features on the interior of the trailing edge region which direct cooling fluid to critical location of the region. The concepts disclosed have application to both turbine vanes and turbine blades.

BACKGROUND ART

An axial flow rotary machine, such as a gas turbine engine for an aircraft, includes a compression section, a combustion section and a turbine section. A flow path for hot working medium gases extends axially through the engine. The flow path for hot gases is generally annular in shape.

As working medium gases are flowed along the flow path, the gases are compressed in the compression section causing the temperature and pressure of the gases to rise. The hot, pressurized gases are burned with fuel in the combustion section to add energy to the gases. These gases are expanded through the turbine section to produce useful work and thrust.

The engine has a rotor assembly in the turbine section which is adapted by a rotor disk and blades extending outwardly therefrom to receive energy from the hot working medium gases. The rotor assembly extends to the compression section. The rotor assembly has compressor blades extending outwardly across the working medium flow path. The high-energy working medium gases in the turbine section are expanded through the turbine blades to drive the rotor assembly about its axis of rotation. The compressor blades rotate with the rotor assembly and drive the incoming working medium gases rearwardly, compressing the gases and imparting a swirl velocity to the gases.

Each rotor blade has an airfoil to direct the hot working medium gases through the stage of rotor blades and to receive work from the gases. As a result, the airfoils are bathed in hot working medium gases during operation causing thermal stresses in the airfoils. These thermal stresses affect the structural integrity and fatigue life of the airfoil. In addition, rotational forces acting on the rotor blade as the rotor blade is driven about the axis of rotation further increase the stresses to which the blade is subjected.

Rotor blades are typically cooled to reduce thermal stresses and thereby provide the rotor blade with a satisfactory structural integrity and fatigue life.

An example of such a rotor blade is shown in U.S. Pat. No. 4,474,532 entitled "Coolable Airfoil For a Rotary Machine", issued to Pazder and assigned to the assignee of this application. Another example of a coolable rotor blade is shown in U.S. Pat. No. 4,278,400 issued to Yamarik and Levengood entitled "Coolable Rotor Blade" and assigned to the assignee of this application. Each of these rotor blades is provided with a plurality of cooling air passages on the interior of the blade. Cooling air is flowed through the passages to the rearmost portion of the rotor blade, commonly referred to as the trailing edge, from whence the cooling air is exhausted into the working medium flow path.

As shown in Yamarik, the trailing edge region of the blade has a plurality of pedestals in the trailing edge region to increase heat transfer. More and more intricate constructions have been formed to increase heat transfer to the cooling air. These include a construction in which a pair of spanwisely extending ribs in the trailing edge region have a plurality of holes for directing cooling air on adjacent structure to improve heat transfer in the trailing edge region of the airfoil. The ribs are relatively small in the chordwise direction and relatively long in the spanwise direction.

During the casting process of such an airfoil, a ceramic core (which defines the openings and structure in the trailing edge region) is disposed on the interior of an airfoil shaped mold. Molten metal is poured around the core, rushing into the mold during the pouting process. The molten metal fills openings to form solid structure and flows around solid ceramic core material to form holes, such as the holes in the ribs. As the molten metal enters the structure, portions of the core in the trailing edge region may collapse resulting in an unusable casting.

The above art notwithstanding, scientists and engineers working under the direction of applicant's assignee are seeking to develop coolable airfoils made from cores which resist the forces imposed on the core during the casting process and which form a cooling structure in the finished airfoil having a satisfactory configuration.

SUMMARY OF INVENTION

According to the present invention a core for forming an airfoil casting thereabout has a pair of spanwisely extending passage elements which support hole-forming elements in the core and are supported chordwisely and spanwisely by a frame having four sides. The frame includes chordwisely passage-forming elements whose spanwise cross-sectional area adjacent to hole-forming elements is about twice the spanwise cross-sectional area or greater of the average cross-sectional area of the hole forming elements to rigidly support the first and second spanwisely extending passage-forming elements.

In accordance with one detailed embodiment of the present invention, the chordwisely extending passage-forming elements are parallel.

In another embodiment the chordwisely extending passage-forming elements are not parallel. In each of these embodiments the chordwisely extending passage-forming elements have a line of continuous core material.

In accordance with one embodiment of the present invention, an airfoil having a trailing edge region has a pair of spanwisely extending ribs interrupted by openings which are supplied with cooling air by a spanwisely extending passage; and, the spanwisely extending passage is in flow communication with the trailing edge region via a tip passage and a root passage having a line of sight past the ends of the spanwisely extending passages.

A primary feature of the present invention is a core for forming an airfoil casting. The core has an array of hole-forming elements, each spaced apart by openings. (The openings create a pair of spanwisely extending ribs having arrays of holes extending therethrough in the finished airfoil). Another feature is a pair of chordwisely extending passage-forming elements. An intermediate (interior) pair of spanwisely extending passage-forming elements are attached thereto at the tip and root ends of the trailing edge region. The chordwise elements are connected by a spanwisely extending passage-forming element and a fourth element which extends spanwisely. These are attached to the ends of the chordwisely extending passage forming element to form a frame for the two interior passage forming elements. In one embodiment, the ratio of the areas of the chordwisely extending passages to the areas of the hole forming elements is about two to one or greater. In one detailed embodiment it is at least four to one.

A primary advantage of the present invention is the acceptability of airfoil castings having a complex trailing edge region which results from positively supporting spanwisely extending elements in the core of the airfoil. Another advantage is the fatigue life of the airfoil which results from effective cooling through use of complex structure in the trailing edge region of the airfoil. Other features and advantages will be apparent from the specification and claims and from the accompanying drawings which illustrate the embodiment of the invention.

BRIEF DESCRIPTION OF THE DRAWING

FIG. 1 is a side elevation view of an airfoil, such as a rotor blade, partly in section and partly broken away to show the suction sidewall on the interior of the airfoil in the trailing edge region of the airfoil.

FIG. 2 is a cross-sectional view of the portion of the core used to form the trailing edge region of the airfoil shown in FIG. 1;

FIG. 3 is a side elevation view of an alternate embodiment of the airfoil shown in FIG. 1, partly in section and partly broken away to show the suction sidewall on the interior of the airfoil in the trailing edge region of the airfoil.

FIG. 4 is a cross-sectional view of the portion of the core used to form the trailing edge region of the airfoil shown in FIG. 3;

FIG. 5 is a view taken in the direction 5—5 of FIG. 1.

FIG. 5a is a view of the core shown in FIG. 2 corresponding to the view taken in FIG. 5 of the rotor blade shown in FIG. 1.

FIG. 6 is a view taken in the direction 6—6 of FIG. 1.

FIG. 6a is a view of the core shown in FIG. 2 corresponding to the view taken in FIG. 6 of the rotor blade shown in FIG. 1.

FIG. 7 is a view taken in the direction 7—7 of FIG. 3.

FIG. 7a is a view of the core shown in FIG. 4 corresponding to the view taken in FIG. 7 of the rotor blade shown in FIG. 3.

FIG. 8 is a view taken in the direction 8—8 of FIG. 3.

FIG. 8a is a view of the core shown in FIG. 4 corresponding to the view taken in FIG. 8 of the rotor blade shown in FIG. 3.

BEST MODE FOR CARRYING OUT THE INVENTION

FIG. 1 shows an airfoil structure, such as a rotor blade 10, for a rotary machine. The airfoil structure includes an airfoil having a first end 14 and a second end 16. The rotor blade has a spanwise reference direction S and chordwise reference direction C. As will be realized, the airfoil structure might be a stator vane.

The rotor blade has a root section 18 and platform section 20 adjacent to the first end. The root section is adapted to engage the rotor of a rotary machines. The platform section is adapted to form a portion of the inner wall of the flow path for working medium gases in a rotary machine. An airfoil section 12 extends outwardly from the platform section. The airfoil section is adapted to extend outwardly across the working medium flow path and has a tip at its most outward end.

The root section has a chordwisely extending root wall 22. A first duct 24, a second duct 26, and a third duct 28 are in flow communication with a source of cooling air, such as a compressor (not shown). These ducts extend through the root wall to the airfoil section.

The airfoil section has a leading edge 34 and a trailing edge 36. A suction sidewall 38 and a pressure sidewall 42 (partially broken away in FIG. 1 for clarity) are joined at the leading edge and the trailing edge. The pressure sidewall is spaced from the suction sidewall to form a cavity 44 therebetween. The cavity is in flow communication via the ducts with the source of cooling air.

A wall extending 46 in the spanwise direction bounds the trailing edge region of the cavity. The wall extends further as a tip wall 48 in the chordwise direction and is spaced spanwisely from the root wall to bound the trailing edge region 50.

The trailing edge region has a plurality of slots 52 at the rear of the airfoil. Each slot is bounded by a teardrop shaped land or pedestal 54 which extends from the pressure sidewall to the suction sidewall. A first rib 56 extends spanwisely between the root wall 22 and the tip wall 48 to leave a first spanwisely extending passage 58 between the rib and the lands. A second rib 62 spaced chordwisely from the first rib is disposed between the first rib and the lands leaving a second spanwisely extending passage 64 extending between the second rib and the lands. The first rib is also spaced chordwisely from the spanwise wall 46 leaving a third passage 66 between the first rib and the wall. The third passage is in flow communication with the third duct for supplying cooling air to the tip region of the airfoil. The first rib has a plurality of holes 68 having an average area $A_1$. The holes extend chordwisely through the rust rib to place the third passage in flow communication with the first passage. The holes are chordwisely aligned with the continuous portion of the second rib 62 to flow air across the first passage and to impinge the cooling air on the second rib.

The second rib 62 has a plurality of second holes 72 through the rib to place the first passage in flow communication with the second passage. The holes in the second rib are each chordwisely aligned with an associated land at the trailing edge of the trailing edge region 50 to impinge cooling air on the land under operative conditions. The holes in the second rib have an average area $A_2$. Each of the holes is disposed about a chordwisely extending reference axis.

A fifth passage 74 extends chordwisely along the tip wall from the third passage to the exit of the turbine blade. The fifth passage cools the critical tip region. The fifth passage has a line of sight communication from the third passage to the exit of the turbine blade. The fifth passage has a minimum cross-sectional area $A_5$ which is at least four times the average cross-sectional area $A_1$, $A_2$ of the holes in the first rib and the second rib.

A sixth passage 76 extends chordwisely from the third passage to the exit of the turbine blade. The sixth passage has a line of sight communication from the third passage to the exit of the turbine blade. The sixth passage has a minimum cross-sectional area in a spanwise direction which is at least four times the cross-sectional area of the holes $A_1$, $A_2$. The sixth passage extends chordwisely adjacent the root wall and is approximately parallel to the fifth passage in the tip region of the airfoil.

FIG. 2 is a cross-sectional view of the trailing edge portion of the core 80 used to form the trailing edge region shown in FIG. 1. For forming the first rib, the core has a rust array 82 of hole forming elements. Each element is disposed about a chordwisely extending reference axis. Each element is spaced spanwisely from the adjacent element leaving a rib forming rust opening 84 therebetween. The first opening has a spanwise cross-sectional area which is greater than the spanwise cross-sectional area of the hole-forming element.

For forming the second rib 62, the core has a second array of hole-forming elements 86. The second array of hole-forming elements are each disposed about a chordwisely extending reference axis. Each element is spaced spanwisely from the adjacent element leaving a rib forming second opening 88 therebetween. The second opening has a spanwise cross-sectional area which is greater than the spanwise cross-sectional area of the hole-forming element. Each second opening is aligned chordwisely with an associated hole-forming element of the first array of hole forming elements.

For forming the lands, the core has a third array of hole-forming elements 92. Each element is disposed about a chordwisely extending reference axis. Each third element 92 is spaced spanwisely from the adjacent element leaving a land forming third opening 94 therebetween. Each third opening has a spanwise cross-sectional area which decreases in the chordwise direction (that is, the direction extending away from the second array of hole-forming elements.) Each third opening is aligned chordwisely with an associated hole-forming element of the second array of hole forming elements.

The core has a rust passage-forming element 96 which extends spanwisely and is spanwisely continuous. The first passage forming element bounds the first and second rib forming openings in a spanwise direction. The first passage-forming element extends chordwisely between and is connected to the first and second arrays of hole forming elements.

A second passage-forming element extends 98 spanwisely and is spanwisely continuous. The second passage-forming element is spaced chordwisely from the first passage-forming element 96. The second passage-forming element bounds the second rib-forming openings in the spanwise direction. The second passage-forming element extends chordwisely between and is connected to the second and third array of hole-forming elements.

A third passage-forming element 102 extends spanwisely and is spanwisely continuous. The third-passage forming element bounds the first rib-forming openings in the spanwise direction and is connected to the lust array of hole-forming elements.

The core has a fourth element 104 which extends spanwisely along the trailing end and is spanwisely continuous. The fourth element bounds the third land-forming elements in the spanwise direction and is connected to the third array of hole-forming elements.

The core has a fifth passage-forming element 106 having a fast end 108 and a second end 112. The fifth passage-forming element extends chordwidely and is attached at the first end to the third passage-forming element 102. The fifth passage-forming element is attached to the first and second passage-forming elements 96, 98 and is attached at the second end to the fourth spanwise element 104.

The core has a sixth passage-forming element 114 having a fast end 116 and a second end 118. The sixth passage forming-element extends chordwisely. The sixth passage-forming element is attached at the first end to the third spanwise passage-forming element 102. The sixth passage-forming element is attached to the first and second passage-forming elements 96,98, as well, and is attached at the second end to the fourth spanwise element 104. Accordingly, as can be seen from FIG. 2, a frame is formed by the third, fifth and sixth passage-forming elements 102, 106, 114 and the fourth element 104. And, across the frame from top to bottom extend the first and second passage forming elements 96, 98 supporting the very small hole-forming elements 82, 86 that extend therebetween. Particularly noteworthy are the fifth and sixth passage-forming elements having a spanwise cross-sectional area which is greater than the average spanwise cross-sectional area of the first and second array of hole-forming elements. As noted before, the ratio of the spanwise cross-sectional areas of the fifth passage to the fast and second array of hole forming elements is at least greater than four.

FIG. 3 is a view corresponding to the view shown in FIG. 1 of an alternate embodiment of the rotor blade shown in FIG. 1. The elements of the blade have the same number with a subscript "a".

The sixth passage 114a, like the sixth passage in FIG. 1, has a line of sight communication extending from the third passage 102a through the rib area 84,88 of the trailing edge region. The sixth passage is not parallel to the fifth passage but like the fifth and sixth passages has an area which is substantially (about twice as big as) the average area through the ribs.

Just as FIG. 3 corresponds to FIG. 1, FIG. 4 corresponds to the core drawing in FIG. 2 and like numerals are used with the subscript a. As can be seen, the sixth passage-forming element 114a is not parallel to the fifth passage-forming element 106a. Nevertheless, the sixth passage forming element has a line of continuous core material extending chordwisely past the first and second arrays of hole forming elements in both chordwise directions. In some constructions, the line of sight may only extend to the lands.

FIGS. 5, 6, 7 and 8 are cross-sectional views of portions of the airfoil to show the relationship of the size of the hole-forming elements to the smallest portion of the chordwisely extending passage.

FIGS. 5A, 6A, 7A, and 8A which show the core are views of the core taken along lines which correspond to the views corresponding to the lines 5A—5A and 6A—6A shown in FIG. 2 and the views taken along the lines 7A—7A and 8A—8A shown in FIG. 4. These show the relative size of areas of the critical chordwisely extending fifth and sixth passages elements 106, 114 to the more delicate hole-forming elements. For example, in the airfoil shown in FIG. 1, the hole forming elements have a lateral dimension of approximately twenty-eight (28) mils by twenty-four (24) mils for a total area of approximately five (5) ten-thousands of a square inch (FIGS. 5, 5A). The passage at the root wall is approximately sixty (60) mils high in the spanwise direction and fifty (50) mils in the lateral or chordwise direction for a total area $A_6$ of twenty-four (24) ten-thousands of a square inch (FIGS. 5, 5A). FIGS. 6, 6A shows a cross-section through the minimum area of the fifth passage having a lateral width of forty-five (45) mils and a spanwise height of eighty (80) mils for a cross-sectional area $A_5$ of thirty (30) thousandths of a square inch.

Similarly, the core dimension is sized with these dimensions to form those size holes which are finished casting.

FIGS. 7 and 8 have small holes in the ribs which are approximately eleven (11) ten thousands of an inch square and holes for the fifth and sixth passages which are approximately twenty-two (22) ten thousands of an inch square.

Similarly, the core shown in FIG. 4 and shown in more detail in FIGS. 7A, 8A has dimensions which are sized to form these holes of FIGS. 7 and 8.

During the casting of the trailing edge region, the frame supports relatively rigidly the first and second passage forming elements and the delicate hole-forming elements and trailing edge slot forming elements in the trailing edge region. Empirical results show a much reduced failure rate compared to prior art construction which did not fixedly support the first and second passages with an exterior frame as shown in FIGS. 2 and 4.

Although this invention has been shown and described with respect to preferred embodiment, it will be understood by those skilled in this art that various changes in form and detail thereof may be made without departing from the spirit and scope of the claimed invention.

We claim:

1. A core for forming an airfoil casting thereabout in a casting process, the core having a trailing edge portion which comprises;
   A. a frame which includes a pair of chordwisely extending passage forming elements having a first end and a second end which are spaced spanwisely one from the other leaving an opening therebetween;
      a pair of spanwisely extending elements, one at each end of the chordwisely extending elements which are attached thereto and which are spaced chordwisely one from the other to bound the opening, one of which is a passage forming element;
   B. a pair of spanwisely extending passage forming elements spaced chordwisely one from the other having a first array of hole-forming elements and a second array of hole-forming elements extending therefrom in the chordwise direction, the hole-forming elements having an avenge spanwise cross-sectional area which is smaller than the smallest spanwise cross-sectional area of the passage-forming elements of the frame;
   wherein the frame acts to positively support both ends of the spanwisely extending passage elements having the hole-forming elements attached thereto during handling of the core and during the casting process.

2. The core of claim 1 wherein the frame of the core is a line of continuous material extending chordwisely past the first and second arrays of hole-forming elements.

3. The core of claim 2 wherein the pair of spanwisely extending passage forming elements is a first passage forming element and a second passage forming element and wherein one of the pair of chordwisely extending passage forming elements is a third passage forming element, and wherein the third passage forming element is attached to the first array of hole-forming elements.

4. The core of claim 2 wherein the pair of chordwisely extending passage forming elements form fifth and sixth passage-forming elements that are parallel.

5. The core of claim 2 wherein the pair of chordwisely extending passage forming elements form fifth and sixth passage-forming elements that are not parallel.

6. A core for forming an airfoil casting thereabout, the core having a trailing edge portion, which comprises:
   A. a first array of hole forming elements,
      A1. each element being disposed about a chordwisely extending reference axis, and
      A2. each element being spaced spanwisely from the adjacent element leaving a rib forming first opening therebetween, the first opening having a spanwise cross-sectional area which is greater than the spanwise cross-sectional area of the hole forming element;
   B. a second array of hole forming elements,
      B1. each element being disposed about a chordwisely extending reference axis
      B2. each element being spaced spanwisely from the adjacent element leaving a rib forming second opening therebetween, the second opening having a spanwise cross-sectional area which is greater than the spanwise cross-sectional area of the hole forming element, and
      B3. each second opening being aligned chordwisely with an associated hole forming element of the fast array of hole forming elements;
   C. a third array of hole forming elements,
      C1. each element being disposed about a chordwisely extending reference axis
      C2. each element being spaced spanwisely from the adjacent element leaving a land forming third opening therebetween, the third opening having a spanwise cross-sectional area which decreases in the chordwise direction extending away from the second array of hole forming elements,
      C3. each third opening being aligned chordwisely with an associated hole forming element of the second array of hole forming elements;
   D. a first passage forming element which extends spanwisely and is spanwisely continuous, which bounds the first and second rib forming openings in the spanwise direction and which extends chordwisely between and is connected to the first and second arrays of hole forming elements;
   E. a second passage forming element which extends spanwisely and is spanwisely continuous, which bounds the second rib forming openings and the third land forming openings in the spanwise direction and which extends chordwisely between and is connected to the second and third array of hole forming elements;
   F. a third passage forming element which extends spanwisely and is spanwisely continuous, which bounds the first rib forming openings in the spanwise direction and is connected to the first array of hole forming elements; and
   G. a fourth element which extends spanwisely and is spanwisely continuous which bounds the third land forming openings in the spanwise direction and is connected to the third array of hole forming elements,
   H. a fifth passage forming element having a first end and a second end, the fifth passage forming element extending chordwisely and being attached at the first end to the third passage forming element, being attached to the first and second spanwise passage forming elements and being attached at the second end to the fourth spanwise element; and, I. a sixth passage forming element having a first end and a second end, the sixth passage forming element extending chordwisely and being attached at the first end to the third spanwise passage forming element, being attached to the first and second spanwise passage forming elements, and, being attached at the second end to the fourth spanwise element; wherein both of the chordwise extending fifth and sixth passage forming elements have a line of continuous core material extending chordwisely past the first and second arrays of hole forming elements, and herein the spanwise cross sectional area of the fifth and sixth passage forming elements is greater than the average spanwise cross-sectional area of the first and second array of hole-forming elements, and wherein the third, fourth, fifth and sixth passage forming elements provide an open continuous structure for supporting the first and second passage forming elements.

7. The core of claim 6 wherein the ratio of the spanwise cross-sectional area of the fifth passage to the avenge spanwise cross-sectional area of the first and second array of hole-forming elements is equal to or greater than two (2.0).

8. The core of claim 7 wherein the ratio of the spanwise cross-sectional area of the fifth passage to the average spanwise cross-sectional area of the first and second array of hole-forming elements is equal to or greater than four (4.0).

9. The core of claim 8 wherein the spanwise cross-sectional area of the fifth passage and the sixth passage are each greater than twenty (20) ten thousandths square inches (0.0020) and the average spanwise cross-sectional area of the first and second arrays of hole-forming elements is about five (5) ten thousandth square inches.

10. The core of claim 7 wherein the fifth and sixth passage forming elements are parallel.

11. The core of claim 7 wherein the fifth and sixth passage forming elements are not parallel.

* * * * *